United States Patent
Brake et al.

(10) Patent No.: US 7,666,946 B2
(45) Date of Patent: Feb. 23, 2010

(54) BLENDS OF BIOPOLYMERS WITH ACRYLIC COPOLYMERS

(75) Inventors: Jeffrey Brake, Newark, DE (US); Sri Seshadri, Holland, PA (US)

(73) Assignee: Arkema Inc., Philadelphia, PA (US)

( * ) Notice: Subject to any disclaimer, the term of this patent is extended or adjusted under 35 U.S.C. 154(b) by 73 days.

(21) Appl. No.: 11/639,099

(22) Filed: Dec. 14, 2006

(65) Prior Publication Data

US 2007/0179218 A1 Aug. 2, 2007

Related U.S. Application Data

(60) Provisional application No. 60/762,657, filed on Jan. 27, 2006, provisional application No. 60/841,644, filed on Aug. 31, 2006.

(51) Int. Cl.
C08F 242/00 (2006.01)
(52) U.S. Cl. .................................................... 525/190
(58) Field of Classification Search ............... 525/54.3, 525/190; 524/27, 47
See application file for complete search history.

(56) References Cited

U.S. PATENT DOCUMENTS

| | | | | |
|---|---|---|---|---|
| 4,133,784 A * | 1/1979 | Otey et al. | ........... | 523/128 |
| 5,252,642 A * | 10/1993 | Sinclair et al. | ........... | 524/108 |
| 5,252,646 A | 10/1993 | Iovine et al. | | |
| 5,422,387 A * | 6/1995 | Toms et al. | ........... | 524/52 |
| 5,478,889 A * | 12/1995 | Biggi et al. | ........... | 525/183 |
| 5,500,465 A * | 3/1996 | Krishnan et al. | ........... | 524/47 |
| 5,502,116 A * | 3/1996 | Noda | ........... | 525/415 |
| 5,508,322 A * | 4/1996 | Bortnick et al. | ........... | 523/201 |
| 5,550,177 A * | 8/1996 | Fanta et al. | ........... | 524/47 |
| 5,629,366 A * | 5/1997 | Rogiers | ........... | 524/56 |
| 5,861,461 A * | 1/1999 | Lee et al. | ........... | 525/54.26 |
| 5,908,918 A | 6/1999 | Chen et al. | | |
| 6,054,510 A * | 4/2000 | Willett et al. | ........... | 524/35 |
| 6,207,792 B1 | 3/2001 | Gruber et al. | | |
| 6,495,631 B1 * | 12/2002 | Randall et al. | ........... | 525/186 |
| 6,515,054 B1 * | 2/2003 | Matsushita et al. | ........... | 524/167 |
| 6,534,572 B1 | 3/2003 | Ahmed et al. | | |
| 6,559,244 B1 | 5/2003 | Sodergard et al. | | |
| 6,869,985 B2 | 3/2005 | Mohanty et al. | | |
| 6,987,128 B2 | 1/2006 | Dalko et al. | | |
| 2003/0079654 A1 * | 5/2003 | Tokiwa et al. | ........... | 106/162.7 |
| 2003/0125436 A1 * | 7/2003 | Syed et al. | ........... | 524/313 |
| 2004/0143072 A1 | 7/2004 | Lewis et al. | | |
| 2004/0230001 A1 * | 11/2004 | Flexman | ........... | 525/154 |
| 2005/0026529 A1 | 2/2005 | Bond et al. | | |
| 2005/0131120 A1 * | 6/2005 | Flexman | ........... | 524/399 |
| 2005/0151296 A1 * | 7/2005 | Obuchi et al. | ........... | 264/171.13 |
| 2005/0153149 A1 * | 7/2005 | Sakane et al. | ........... | 428/534 |
| 2005/0154148 A1 | 7/2005 | Nakamich et al. | | |
| 2006/0175728 A1 | 8/2006 | Lavach et al. | | |
| 2007/0032577 A1 * | 2/2007 | Kanzawa et al. | ........... | 524/31 |
| 2007/0149687 A1 * | 6/2007 | Sunagawa et al. | ........... | 524/458 |
| 2007/0276090 A1 * | 11/2007 | Aoki et al. | ........... | 525/70 |

FOREIGN PATENT DOCUMENTS

JP 2004269720 A * 9/2004

OTHER PUBLICATIONS

Machine Translation of JP 2004269720 A (2008).*
Zhang et al., Journal of Polymer Science: Part B: Polymer Physics, vol. 41, p. 23-30, 2003.*

* cited by examiner

*Primary Examiner*—Mark Eashoo
*Assistant Examiner*—Liam J Heincer
(74) *Attorney, Agent, or Firm*—Thomas F. Roland

(57) ABSTRACT

The invention relates to a blend of one or more biopolymers with one or more acrylic copolymers, for the purpose of improving the properties of the biopolymer(s). The biopolymer composition comprises 85-99.9 weight percent of biopolymer(s) and 0.1 to 15 weight percent of one or more acrylic copolymers.

9 Claims, No Drawings

BLENDS OF BIOPOLYMERS WITH ACRYLIC COPOLYMERS

This application claims benefit under U.S.C. §119(c) of U.S. provisional applications 60/762657, filed Jan. 2, 2006 and 60/841644, filed Aug. 31, 2006.

FILED OF THE INVENTION

The invention relates to a blend of one or more biopolymers with one or more acrylic copolymers, for the purpose of improving the properties of the biopolymer(s). The biopolymer composition comprises 85-99.9 weight percent of biopolymer(s) and 0.1 to 15 weight percent of one or more acrylic copolymers.

BACKGROUND OF THE INVENTION

Biopolymers are finding use as environmentally-friendly alternatives for many common plastics in typical applications, such as in packaging materials and bottling.

One problem with many biopolymers, for instance polylactide, is the poor release from metals when heated above the glass transition temperature (~50° C. for polylactide). This property is further worsened when heated above the melting temperature of the biopolymer (>150° C. for polylactide). The poor metal sticking release of polylactide leads to difficulties in melt processing, such as release from molds (injection molding, blow molding, thermoforming) and calendering equipment. In the case of calendering, it is not possible to process neat polylactide resin.

Acrylic copolymers have been used as process aids in PVC and polystyrene blends, such as in U.S. patent application Ser. No. 11/053364, however it would not be obvious to use similar processing aids with biopolymers to achieve an improved metal release, as well as an improvement in other properties such as melt strength. In polycarbonate, for example, no significant improvements in melt strength were noted with the use of an acrylic copolymer processing aid.

Surprisingly it has been found that the addition of small levels of certain acrylic copolymers to a biopolymer or biopolymer blend enable biopolymers to be melt processed without the metal release problem. In addition, it was found that the composition of the invention provided improved melt strength, improved draw-down ratio and an improved melt viscosity.

SUMMARY OF THE INVENTION

The invention relates to a biopolymer composition comprising:
 a) 85 to 99.9 weight percent of one or more biopolymers; and
 b) 0.1 to 15 weight percent of one or more acrylic copolymers.

Preferably the biopolymer composition comprises at least one synthetic biopolymer, such as polylactide or polyhydroxy butyrate.

DETAILED DESCRIPTION OF THE INVENTION

The invention relates to blends of one or more biopolymer with one or more acrylic copolymers to produce a biopolymer composition having good metal release, as well as other improved properties such as melt strength.

"Biopolymer(s)" as used herein refers to a single biopolymer or a mixture of two or more biopolymers. "Biopolymers" is used to denote both natural polymers, including but not limited to polysaccharides (cellulose, starch, etc); polymers synthesized from natural products and by-products, including but not limited to polyamide 12, polycaprolatetam, and aliphatic or aromatic polyesters; and biodegradable polymers including but not limited to polylactide, and polyhydroxy butyrate.

The biopolymer composition comprises 85 to 99.9 weight percent of the one or more biodegradable polymers.

In one embodiment, the biopolymer composition contains from 30 to 99.9 weight percent of polylactide and/or polyhydroxy butyrate, which can be of normal or low molecular weight.

One or more acrylic copolymers are used as process aids for the biodegradable polymers. By "copolymers" as used herein is meant polymers having two or more different monomer units—including terpolymers and polymers having 3 or more different monomers. The copolymers could be random, block, gradient or of other architectures. "Acrylic copolymers" as used herein, refers to copolymers having 60 percent or more of acrylic and/or methacrylic monomer units. "(meth) acrylate" is used herein to include both the acrylate, methacrylate or a mixture of both the acrylate and methacrylate. Useful acrylic monomers include, but are not limited to methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, amyl (meth)acrylate, isoamyl (meth)acrylate, n-hexyl (meth)acrylate, cycloheyl (meth)acrylate, 2-ethylhexyl (meth)acrylate, pentadecyl (meth))acrylate, dodecyl (meth)acrylate, isobornyl (meth)acrylate, phenyl (meth)acrylate, benzyl (meth)acrylate, phnoxyethyl (meth)acrylate, 2-hydroxyethyl (meth)acrylate and 2-methoxyethyl (meth) acrylate. Preferred acrylic monomers include methyl acrylate, ethyl acrylate, butyl acrylate, and 2-ethyl-hexyl-acrylate, methyl methacrylate, ethyl methacrylate, and butyl methacrylate.

In addition to the acrylic monomer units, the acrylic copolymer of the invention can also include) to 40 percent of other ethylenically unsaturated monomers polymerizable with the acrylic monomers, including, but not limited to styrene, alpha-methyl styrene, butadiene, vinyl acetate, vinylidene fluorides, vinylidene chlorides, acrylonitrile, vinyl sulfone, vinyl sulfides, and vinyl suloxides. In one embodiment, the copolymer contains styrene.

In one embodiment, the acrylic copolymer contains both acrylate and methacrylate monomer units. One embodiment of the invention is a terpolymer of methyl methacrylate-butyl acrylate-butyl methacrylate with a butyl methacrylate content of 20% having a weight average molecular weight of 300,000 g/mol.

In another embodiment, the acrylic copolymer comprises 10-75 weight percent of methyl methacrylate units, 10 to 50 weight percent of butyl acrylate units, 0 to 50 weight percent of butyl methacrylate units, and from 0 to 80 weight percent of styrene, the total adding to 100 percent.

The copolymer of the invention can be made by conventional polymerization techniques, including, but not limited to mass, bulk, solution, suspension, emulsion and inverse emulsion polymerization.

The acrylic copolymer of the invention generally has a weight average molecular weight in the range of 10,000 to 3,000,000 g/mol.

The acrylic copolymer of the invention can be a blend of two or more acrylic copolymers. In one embodiment a blend of acrylic-methacrylic copolymers having varying molecular weights and monomeric content can be utilized. It has been found that a blend having one copolymer with molecular weight >500000 g/mol and one with a molecular weight <500000 g/mol can be utilized to provide dual metal release and improved melt strength while retaining clarity.

The biopolymer composition of the invention contains 85-99.9 weight percent of the biopolymer, and from 0.1-15 weight percent of the acrylic copolymer(s). The ingredients may be admixed prior to processing, or may be combined during one or more processing steps, such as a melt-blending operation. This can be done, for instance by single-screw extrusion, twin-screw extrusion, Buss kneader, two-roll mill, impeller mixing. Any admixing operation resulting in a homogeneous distribution of acrylic-methacrylic copolymer in the biopolymer is acceptable. Formation of the blend is not limited to a single-step formation. Masterbatch formation of 15-99% acrylic-methacrylic copolymer in 1-85% carrier polymer followed by subsequent addition to the biopolymer to derive a final blend is also anticipated. The carrier polymer may be, but is not limited to, one or more biopolymers, acrylic-methacrylic copolymers, and methacrylic homopolymers.

In addition to the biopolymer(s), and acrylic copolymer(s), the composition of the invention may additionally contain a variety of additives at from 0-100 weight percent based on the weight of the biopolymer(s) plus acrylic copolymer(s). The additives may include, but not limited to, heat stabilizers, internal and external lubricants, impact modifiers, process aids, fillers, and pigments. Impact modifiers, either core/shell or block copolymers having at least one low Tg and one high Tg block or layer, are especially useful in the biopolymer composition. In one embodiment, the impact modifier is an ethylene-propylene based copolymer with acrylates or a core-shell polymer having a rubbery core, such as 1,3-dienes (also copolymers with vinyl aromatics) or alkyl acrylates with alkyl group containing 4 or more carbons and the shell is grafted onto the core and is comprised of monomers such as vinyl aromatics (e.g., styrene), alkyl methacrylates (alkyl group having 1-4 carbons), alkyl acrylates (alkyl group having 1-4 carbons), and acrylonitrile.

The biopolymer composition of the invention was found to have many improved properties over the biopolymer alone. These improved properties include for an examplatory polylactide/copolymer blend:
- clarity (haze <10 for 0.018" thickness),
- metal release (evaluated by two-roll milling sticking times >1 minute),
- improved melt strength (>100% improvement over polylactide), and
- improved flexural performance (>10% increase in strain at break).

The compositions of this invention may provide additional benefits, such as reduced torque and higher flow during processing; improved melt strength for deep-draw thermoforming, blow molding, and foaming; improved draw-down in thermoforming; improved tensile and flexural strength; and improved impact resistance.

The composition of the invention can be processed into articles using any known method, including but not limited to injection molding, extrusion, calendaring, blow molding, foaming and thermoforming. Useful articles that can be made using the biodegradable composition, include but are not limited to packaging materials, films and bottles. One in the art can imagine a variety of other useful articles and processes for forming those articles, based on the disclosure and examples herein.

The biopolymer composition may contain impact modifier of at least two different types of impact modifiers.

The acrylic copolymer is a blend of two or more copolymers.

The biopolymer composition may be clear.

The biopolymer composition may contain from 0 to 69.9 weight percent one or more polymers selected from the group consisting of starch, cellulose, polysaccharides, aliphatic or aromatic polyesters, polyamide 11, and polycaprolactam.

The improved properties of the composition of the invention over the biopolymer alone include:
- facilitating the release of the biopolymer composition from metals (e.g., chrome) at temperatures between 50-250° C. and processing times between 0.1-60 minutes
- the impact resistance is increased by >10% compared to unmodified biodegradable polymer.
- improved property is that the draw-down ratio of the material is increased by >10%.
- the processing viscosity (1 to 10000 sec-1 shear rate) of the resin is decreased by >10% yielding reduced torque, which can also be measured as melt flow rate increase by >10%.
- the processing viscosity (1 to 10000 sec-1 shear rate) of the resin is increased by >10% yielding improved melt strength, which is also measured as melt flow rate decrease by >10%.
- the molded color of the resin is improved of defects such as gate blush and tiger stripes.
- is a combination of metal release and higher melt strength.
- a modulus increase of greater than 10%.
- the heat distortion temperature is increased by >10%, which also means the serviceable temperature is increased by >10%.
- the thermal and hydrolytic stability is increased.

Examples

A blend of 95-99% polylactide containing 1-5% by weight of acrylic-methacrylic copolymer was formed by melt extrusion using a twin-screw extruder. The processing temperature and melt temperature during extrusion were maintained above the melting temperature of polylactide (>152° C.) to ensure a homogeneous melt. The extrudate was pelletized and processed either via injection molded or via two-roll mill. Injection molding was performed with a nozzle temperature above polylactide melting temperature (>152° C.) and the mold temperature was maintained below polylactide glass transition temperature (<50° C.). A cycle time of <60 seconds and a dual-cavity ASTM flexural bar mold were used. Mold release was assessed by collecting molded samples until part warpage was observed upon ejection. The number of shots processed on a clean mold surface (no mold release agent) was used as a gauge of melt release properties. Two-roll mill processing was performed by heating the rolls above the melt temperature of polylactide (>152° C.). Relative roll speed, gap size, and roll rpm were varied from 1 to 1.3, 0.02 to 0.1 mm, and 10-30 rpm, respectively. The blend was introduced to the rolls until a continuous film was formed on the rolls (banding). The film was then cut and pulled from the roll every 30 seconds until the film was unable to be pulled from the roll. The time required for sticking was recorded as the measure of mill sticking.

Melt strength was assessed by capillary rheometer tied to a rheotens melt strength measurement device. Blends were extruded through the capillary at a fixed speed and accelerated using the rheotens. The force required to accelerate the extrudate and the speed differential between extrusion and take-off (draw-down) were recorded until strand rupture. Addition of acrylic copolymers at 5% having molecular weights >1,000,000 and compositions of copolymer of methyl methacrylate and butyl acrylate were observed to produce draw-down improvements of >20% and melt strength improvements of >100%.

What is claimed is:

1. A biopolymer composition comprising:
   a) 85 to 99.9 weight percent of one or more biopolymers, wherein said biopolymer comprises at least one synthetic biopolymer selected from the group consisting of polylactide and polyhydroxy butrate, and wherein said polylactide and/or polyhydroxy butyrate comprise 30-99.9 weight percent of the total biopolymer composition; and
   b) 0.1 to 15 weight percent of one or more acrylic copolymers having a weight average molecular weight of greater than 1,000,000, wherein said acrylic copolymer consists of 60 percent or more of an acrylic and/or methacrylic monomer units, and 0-40 percent of one or more other ethylenically unsaturated monomers selected from the group consisting of styrene, alpha-methyl styrene, butadiene, vinyl acetate, vinylidene fluorides, vinylidene chlorides, acrylonitrile, vinyl sulfone, vinyl sulfides, and vinyl suloxides.

2. The biopolymer composition of claim 1 further comprising a low level of up to 10 weight percent of impact modifier, based on the weight of the biopolymer.

3. The biopolymer composition of claim 2, wherein said impact modifier comprises at least two different types of impact modifiers.

4. The biopolymer composition of claim 1 wherein said biopolymer has a weight average molecular weight of from 10,000-3,000,000 g/mol.

5. The biopolymer composition of claim 1 wherein the acrylic copolymer is a blend of two or more copolymers.

6. The biopolymer composition of claim 1, wherein said composition is clear.

7. The biopolymer composition of claim 1, wherein said biopolymer composition comprises from 0 to 69.9 weight percent one or more polymers selected from the group consisting of starch, cellulose, polysaccharides, aliphatic or aromatic polyesters, polyamide 11, and polycaprolactam.

8. A process for improving the properties of a biopolymer or biopolymer blend comprising admixing 0.1 to 15 weight percent of one or more acrylic copolymers with 85 to 99.9 weight percent of said biopolymer or biopolymer blend to form a biopolymer composition wherein said biopolymer comprises at least one synthetic biopolymer selected from the group consisting of polylactide and polyhydroxy butyrate, and wherein said polylactide and/or polyhydroxy butyrate comprise 30-99.9 weight percent of the total biopolymer composition; and wherein said acrylic copolymers have a weight average molecular weight of greater than 1,000,000, and wherein said acrylic copolymer consists of 60 percent or more of an acrylic and/or methacrylic monomer units, and 0-40 percent of one or more other ethylenically unsaturated monomers selected from the group consisting of styrene, alpha-methyl styrene, butadiene, vinyl acetate, vinylidene fluorides, vinylidene chlorides, acrylonitrile, vinyl sulfone, vinyl sulfides, and vinyl suloxides.

9. An formed article comprising the biopolymer composition of claim 1.

* * * * *